Figure 1:
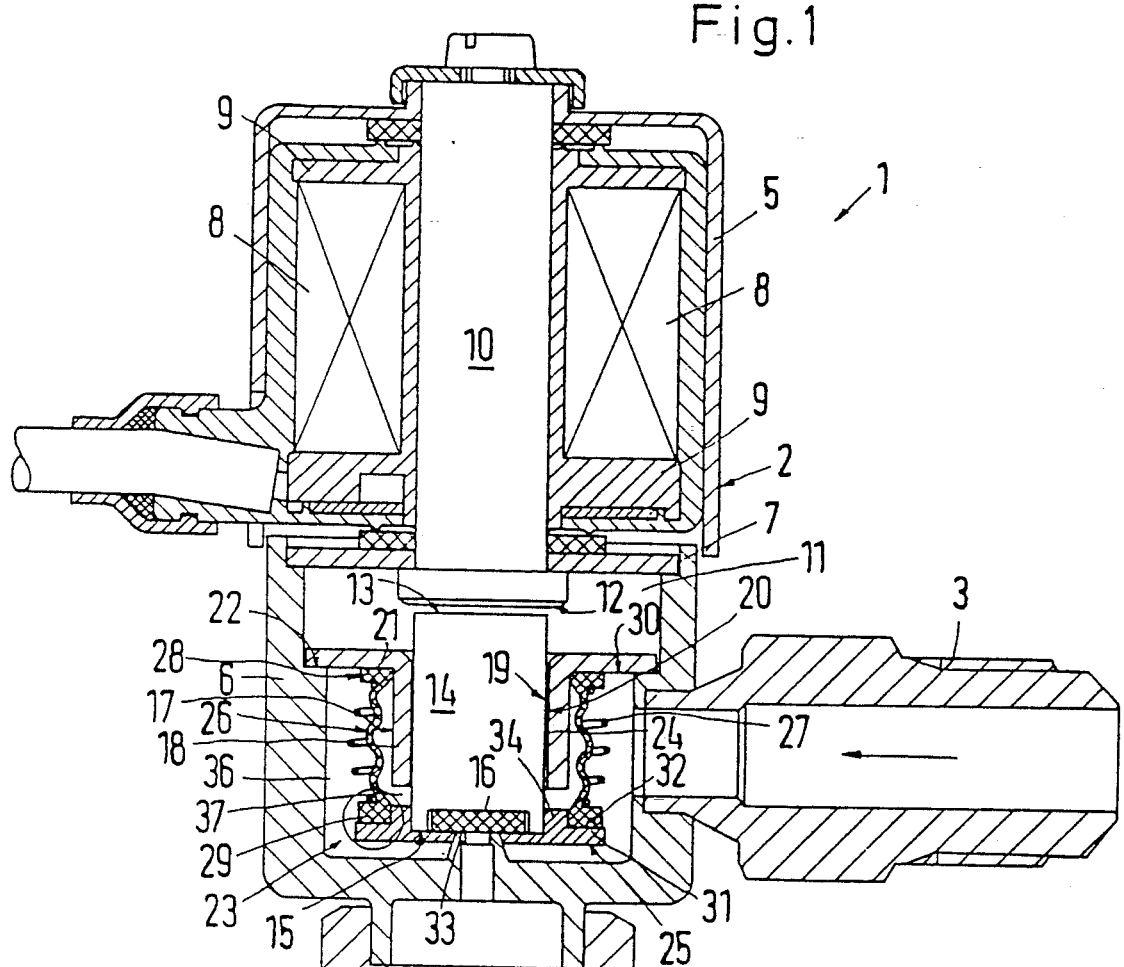

United States Patent [19]

Nicolaisen

[11] Patent Number: 5,165,652
[45] Date of Patent: Nov. 24, 1992

[54] ELECTROMAGNETIC VALVE HAVING A THROTTLE PATH CONNECTED TO A DAMPING CHAMBER

[75] Inventor: Holger Nicolaisen, Nordborg, Denmark

[73] Assignee: Danfoss A/S, Nordborg, Denmark

[21] Appl. No.: 772,232

[22] Filed: Oct. 7, 1991

[30] Foreign Application Priority Data

Nov. 16, 1990 [DE] Fed. Rep. of Germany ....... 4036991

[51] Int. Cl.⁵ .............................................. F16K 31/02
[52] U.S. Cl. ...................................... 251/51; 251/54; 251/129.17; 251/335.3
[58] Field of Search ....................... 251/48, 50, 51, 52, 251/53, 54, 129.15, 129.17, 335.3

[56] References Cited

U.S. PATENT DOCUMENTS

| | | | |
|---|---|---|---|
| 2,920,254 | 1/1960 | Ray | 251/54 |
| 3,011,753 | 12/1961 | Kroffke | 251/51 |
| 3,108,777 | 10/1963 | Ray | 251/54 |
| 3,157,831 | 11/1964 | Ray | 251/54 |
| 3,159,774 | 12/1964 | Dube et al. | 251/54 |
| 3,326,511 | 6/1967 | Hallgreen | 251/54 |
| 3,441,246 | 4/1969 | Lauppe et al. | 251/52 |
| 3,446,471 | 5/1969 | Westphal | 251/52 |
| 3,606,241 | 9/1971 | Bornholdt | 251/52 |

FOREIGN PATENT DOCUMENTS

| | | |
|---|---|---|
| 688253 | 2/1940 | Fed. Rep. of Germany ... 251/335.3 |
| 1237394 | 3/1967 | Fed. Rep. of Germany ......... 251/129.17 |

Primary Examiner—George L. Walton
Attorney, Agent, or Firm—Wayne B. Easton

[57] ABSTRACT

The coil arrangement of an electromagnetic valve has a stationary core that is provided with a stop face for having one end of an armature abut thereagainst. The stop face and the one end of the armature is located in a damping chamber, the other end of the armature mounting a closure member for abutting against a valve seat to block fluid flow therethrough. Between the armature and the guide member there is a throttle path that fluidly connects the damping chamber with the valve seat chamber. The electromagnetic valve is especially suitable for conveying contaminated media.

14 Claims, 3 Drawing Sheets (A-A)

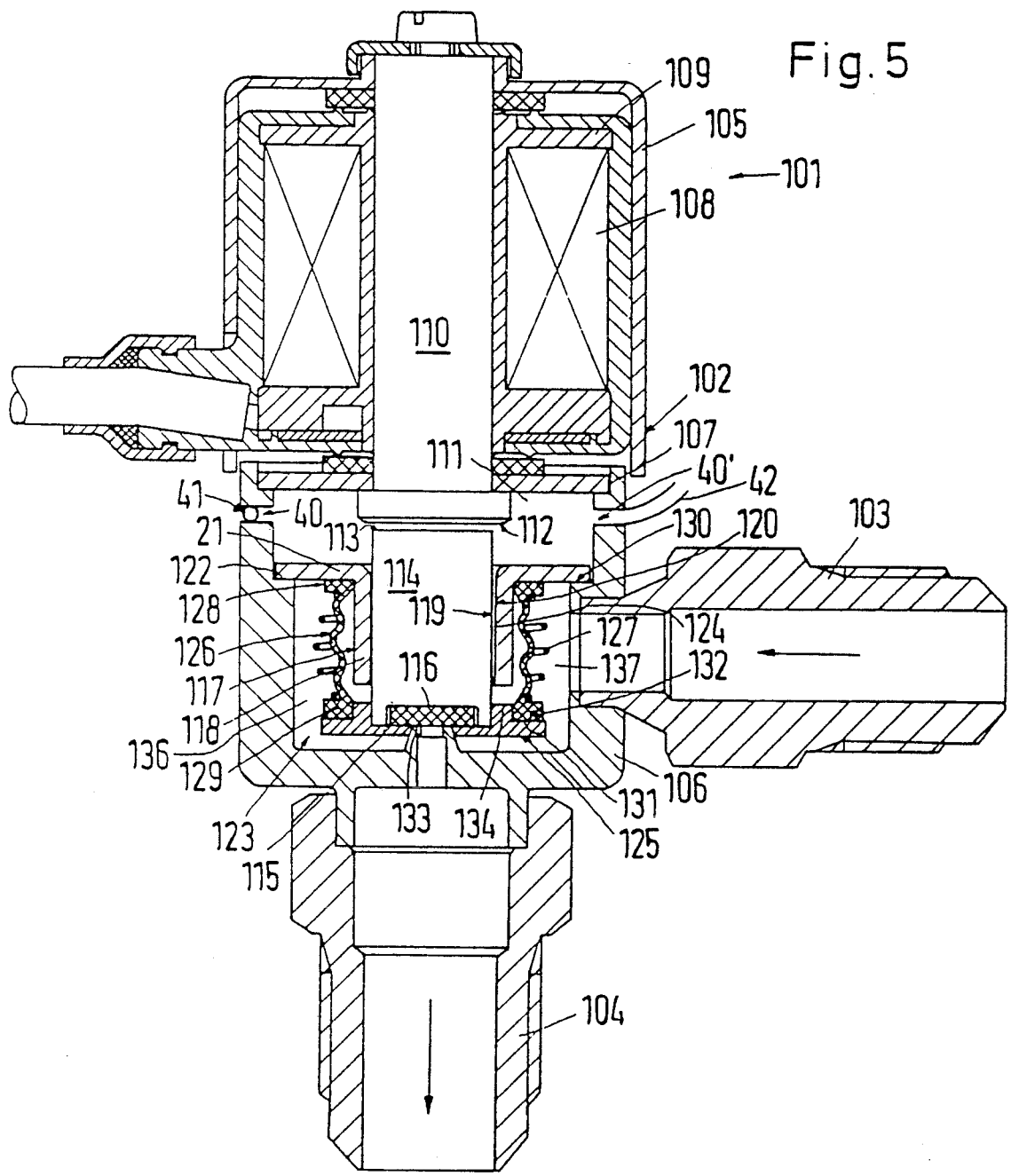

ELECTROMAGNETIC VALVE HAVING A THROTTLE PATH CONNECTED TO A DAMPING CHAMBER

The invention relates to an electromagnetic valve with a coil arrangement, an armature movable by the coil arrangement, a guide means for the armature, at least one throttling path being formed between the guide means and the armature, a closure member arranged on the armature, a damping chamber connected with the throttling path and a housing with a valve seat chamber with a valve seat.

An expansion valve of this kind for readily volatile liquids, especially for refrigerating plants, is known from DE-PS 34 41 251 (U.S. Pat. No. 4,614,327) with that expansion valve the damping of the movement of a valve plunger is achieved with the assistance of a damping piston engaging in a damping cylinder. The annular gap between the damping piston and the cylinder wall is very small and serves as the throttling path. In addition, the stop face of the armature is directly exposed to the medium flowing through the valve. That is the reason why the function of the valve is badly impaired when contaminants in the medium collect on the stop faces. Filters connected to the supply have been used in attempts to combat this susceptibility to contaminants. These filters were in some cases mounted directly in the valve, or alternatively arranged so that the medium was filtered before entering the valve. Nevertheless, these filters are not fully able to prevent particles of iron or other magnetically susceptible particles settling on the pole face and influencing the function of the valve.

These measures have therefore proved unsatisfactory when using heavily contaminated media.

The invention is therefore based on the problem of providing a valve of the kind mentioned in the introduction that operates without impairment despite contaminants in the medium.

This problem is solved according to the invention in that the coil arrangement has a stationary core with a stop face arranged in the damping chamber and cooperating with one side of the armature, and the armature carries the closure member on its opposite side.

In this construction, the stop faces are not able to become contaminated, because they are arranged in the damping chamber and are therefore no longer in direct contact with the flowing medium. The exchange of medium from the valve seat chamber via the throttling path to the damping chamber caused by the movement of the armature is so slight that it is virtually impossible for contaminants to get into the damping chamber.

It has proved to be an advantage for the guide means of the armature to comprise a cylindrical guide part with longitudinal grooves arranged on its inside. The longitudinal grooves on the inside of the cylindrical guide part form the throttling path between the guide means and the armature. The armature has only slight freedom of movement in the guide part between the longitudinal grooves. This structural measure contributes to a reduction in the flow cross-section of the medium from the valve seat chamber to the damping chamber, in order to ensure that only a small flow of medium reaches the damping chamber via the throttling path.

The guide means preferably has an angled flange. This can lie on a projection between the valve seat chamber and the damping chamber and can be fixed there, for example, by means of a circular pressure weld. In this manner the flange isolates the damping chamber hermetically from the valve seat chamber.

It has proved to be an advantage for a supporting ring to be arranged on the side of the armature carrying the closure member. This supporting ring is fixedly connected to the outside of the armature and in this manner enlarges the diameter thereof.

In a preferred embodiment, the throttling path is separated taken along the line and in the direction of the arrows A—A of the valve seat chamber with the aid of a resilient sealing element. The sealing element surrounds the cylindrical guide part and the part of the armature projecting beyond the cylindrical guide part. It can be of bellows-shaped form and be arranged between the supporting ring of the armature and the flange of the guide means. In this manner the valve seat chamber is divided into an outer chamber, through which contaminated medium flows when the valve is open, and an inner chamber connected to the throttling path, and the throttling path is screened from the outer chamber of the valve seat chamber.

It is advantageous for the closure member to be biased by a restoring spring which holds the resilient sealing element captive, the resilient sealing element being clamped between the restoring spring and the supporting ring or flange respectively. This structural feature means that the restoring spring fulfils a dual role: on the one hand it brings the closure member into the closed position when the coil is switched off, and on the other hand it holds the sealing element captive and lends it stability against extreme radial deformations. In this way, a simple structural design of the electromagnetic valve is provided.

In a further development of the electromagnetic valve according to the invention, provision is made for the resilient sealing element to have a circumferential, angled and reinforced collar at each of its two ends, the one collar being arranged on the side of the flange of the guide means remote from the damping chamber and the other collar being arranged on the supporting ring of the armature. These angled and reinforced collars of the sealing element enlarge the bearing face of the sealing element at the inside of the flange and on the supporting ring respectively. The sealing element is thereby stabilized when subjected to pressure stress. Lugs on the inside of the flange and the supporting ring can secure the sealing ring against radial displacement.

In a further development of the invention, provision is made for the supporting ring of the armature to have a circumferential projection and for a channel to be formed between the projection and angled collars of the sealing element. It is also conceivable for a channel to be formed between the flange of the guide means and the angled collar of the sealing element arranged on the inside of the flange. This means that on the initial filling, medium is able to flow through at least one of these channels, which can be in the form of an annular gap for example, to the throttling path and on to the damping chamber.

In an alternative construction of the invention, it has proved an advantage for a one-way valve open towards the inner chamber of the valve seat chamber to be provided on at least one collar of the sealing element. This one-way valve can, for example, be formed as an opening with a substantially trapezoidal cross-section and an obliquely running edge in a collar of the sealing element. When the outer chamber of the valve seat chamber is filled as the electromagnetic valve is being commissioned, the one-way valve will open so that the inner chamber of the valve seat chamber is filled. As soon as the inner and outer pressures are the same, the one-way valve closes. With this construction of the invention, during operation there is no exchange of medium between the inner chamber and outer chamber of the valve seat chamber. The damping medium is thereby separated from the medium flowing through the valve.

It is particularly advantageous for the damping medium and the fed-through medium to be different media. In this way, for example, a heavily contaminated fed-through medium can be conveyed without the function of the valve being impaired. In some cases, it is also necessary to use as the damping medium a medium having different physical properties from the fed-through medium, such as a different viscosity, for example.

Filling the inner chamber of the valve seat chamber and the damping chamber can be effected before commissioning, for example during the valve manufacture.

In a further alternative construction of the electromagnetic valve, it has proved an advantage for the damping chamber to have a filling opening. Via this filling opening the damping medium can be introduced in a simple manner from the outside into the inner chamber of the valve seat chamber, without fear of admixing with the fed-through medium in the outer chamber of the valve seat chamber.

It has proved an advantage therein for the filling opening to be sealable with a sealing element. A suitable sealing element is, for example, a ball with a larger diameter than the filling opening, which is pressed into the filling opening after the filling operation.

It is also possible, however, for the filling opening to have a filling nipple, which can be sealed by being pressed together or by soldering.

It has proved an advantage for the sealing element to consist of a rubber or plastics material, or of a metal. The choice of a suitable material depends on the specific conditions of the application, such as, for example, temperature, aggressiveness of the media to be conveyed, degree of desired damping, and so on.

Figure 2:
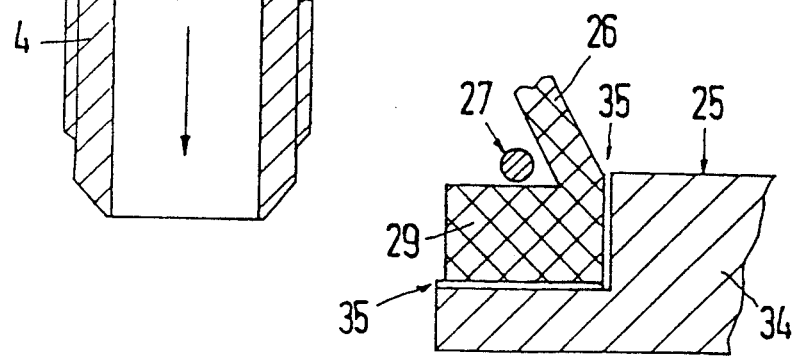
Figure 3:
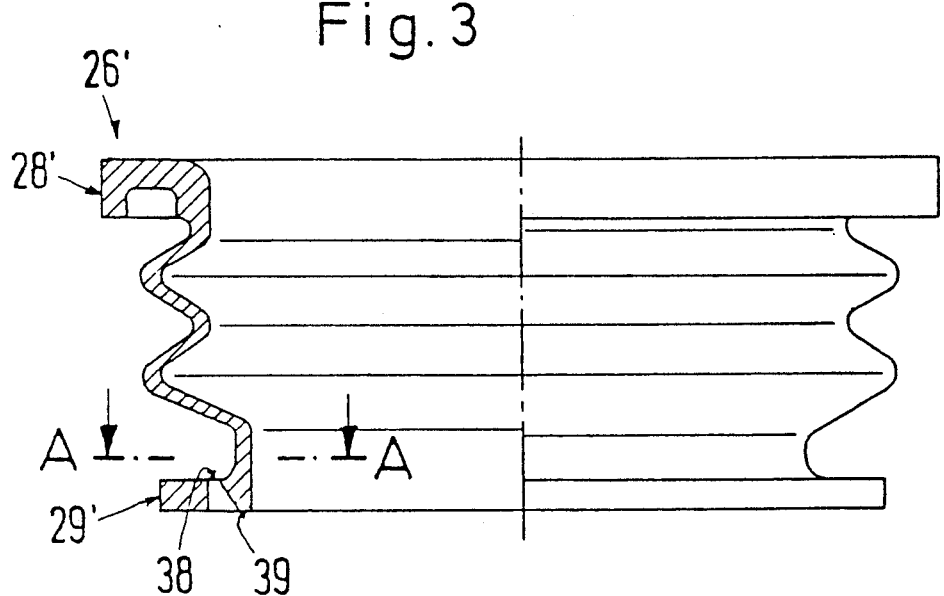
Figure 4:
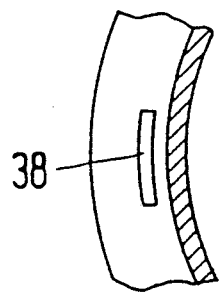

The invention is described in the following with reference to preferred embodiments in conjunction with the drawing. In the drawing, FIG. 1 shows a longitudinal section through an embodiment of the electromagnetic valve according to the invention, FIG. 2 shows an enlarged detail portion of the electromagnetic valve from FIG. 1, FIG. 3 shows an enlarged portion of the sealing element from FIG. 1, FIG. 4 shows an enlarged portion from FIG. 3, and FIG. 5 shows a longitudinal section through an alternative embodiment of the electromagnetic valve according to the invention.

The electromagnetic valve 1 illustrated in FIG. 1 has a housing 2 with an inlet nipple 3 and an outlet nipple 4. The valve housing 2 consists of a coil housing 5 and a cup-shaped armature housing 6, which are joined to one another along the edge 7. The coil housing 5 carries a coil arrangement 8 on its support 9. A stationary core 10, which projects with its lower end into a damping chamber 11 and has a stop face 12, is integrated into the coil arrangement 8. The stop face 12 co-operates with one side 13 of an armature 14, which on its other side 15 bears a closure member 16 and is guided in a guide means 17. The guide means 17 of the armature 14 has a cylindrical guide part 18 with longitudinal grooves 20 arranged on its inside 19 and an angled flange 21.

The flange 21 of the guide means 17 extends radially outwardly of the guide part 18 and is positioned on a projection 22 of the armature housing 6 and is connected by means of a circular pressure weld to the armature housing 6. The flange 21 divides the inside of the armature housing 6 into the damping chamber 11 and a valve seat chamber 23. The longitudinal grooves 20 on the inside 19 of the cylindrical (annular) guide part 18 form a throttling path 24 via which the valve seat chamber 23 is connected to the damping chamber 11.

On the side 15 of the armature 14 bearing the closure member 16, there is arranged a supporting ring 25 with a circumferential projection 34. A sealing element 26, which is held captive by a restoring spring 27 biasing the closure member 16, is arranged between the flange 21 and the supporting ring 25. The sealing element 26 is in the form of a bellows and at each of its two ends has circumferential, angled and reinforced collars 28, 29 which are clamped between the inside 30 of the flange 21 and the inside 31 of the supporting ring 25. To secure the sealing element 26 against radial displacement, the supporting ring 25 has a lug 32.

When the coil arrangement 8 is electrically energized, the core 10 becomes magnetized to axially the armature 14 against the stop face 12. The medium then passes out of the damping chamber 11 through the throttling path 24 into the valve seat chamber 23. At the same time the valve 1 opens, and the medium flows from the inlet nipple 3 via the valve seat chamber 23 and then through the valve seat 33 to the outlet nipple 4. The restoring spring 27 ensures that the valve 1 closes when the coil arrangement 8 is no longer energized so that the closure 16 blocks fluid flow through the valve seat 33 from the valve seat chamber to the outlet nipple. The armature 14 is guided like a piston with limited freedom of movement in the cylindrical guide part 18. By this means, the access of the medium to the damping chamber 11, where the magnetized stop faces 12, 13 lie, is restricted.

FIG. 2 shows a detail portion of the supporting ring 25 and the sealing element 26 of the electromagnetic valve of FIG. 1. It is clear from this illustration that between the supporting ring 25 and the angled collar 29 of the sealing element 26 there is a channel 35. This channel 35 forms a throttle between the outer chamber 36 of the valve seat chamber 23 and the inner chamber 37 thereof. When the damping chamber 11 is initially filled, medium flows from the valve seat chamber 23 via the channel 35 and the throttling path 24 into the damping chamber 11. On operation of the valve 1, however, medium is forced through the throttling path 24 into the inner chamber 37 of the valve seat chamber 23. The sealing element 26 is able to expand and/or a limited amount of medium is able to flow through the channel 35 into the outer chamber 36 of the valve seat chamber 23.

FIGS. 3 and 4 show portions of alternative forms of the sealing element 26'. On the angled collar 29' of the sealing element 26' there is arranged a one-way valve 38, via which the inner chamber 37 of the valve seat chamber 23 and the damping chamber 11 can be filled. The one-way valve 38 is essentially in the form of an opening with a trapezoidal cross-section. During the filling operation the medium exerts a pressure on the inclined pressure face 39 which is pressed radially inwards as a consequence thereof and thus opens the passage for the filling medium. If the pressure in the inner chamber 37 exceeds the pressure in the outer chamber 36 of the valve seat chamber 23, then the one-way valve 38 closes.

FIG. 5 shows further alternative forms of a filling device for the damping chamber 111. The reference numbers for corresponding unchanged parts of the electromagnetic valve have been increased by 100 with respect to those of FIG. 1.

The damping chamber 111 has a filling opening 40 with a sealing element pressed therein, in the embodiment illustrated a ball 41. The ball 41 has a larger diameter than the filling opening 40 and is pressed into the filling opening 40 after the filling operation. On the opposite side of the damping chamber 111 the filling opening 40' is shown with a filling nipple 42. After the filling operation the filling nipple 42 is pressed together or soldered.

In the embodiments of the electromagnetic valve 1 and 101 respectively, shown in FIGS. 3 to 5, as damping medium a different medium from the fed-through medium can be used. The medium can be introduced during the valve manufacture.

I claim:

1. An electromagnetic valve, comprising an armature housing, dividing means for dividing the housing into a damping chamber and a valve seat chamber, a valve seat opening to the valve seat chamber, said housing having an inlet opening to the valve seat chamber and an outlet opening to the valve seat, an armature extending within the damping chamber and being axially movable in the housing said damping chamber and said armature being enclosed by a sealing means said armature having a first axial end portion and an axially opposite second end portion, guide means within at least a portion of said sealing element in the housing for having the armature axially moving therein, said guide means and said sealing means defining upper and lower cavities within said damping chamber, said damping chamber receives fluid therein from the inlet opening through a first throttle means disposed between one end of said sealing means and said valve seat and a second throttle disposed between said guide means and said armature, an energizable coil arrangement for axially moving the armature, the coil arrangement including a stationary core having a stop surface in the damping chamber that is abuttable against the armature first end portion for limiting the movement of the armature away from the valve seat, a valve member mounted to the armature second end portion to move therewith between positions for permitting fluid flow from the inlet and through the valve seat to the outlet and blocking fluid flow through the when said coil is energized and de-energized, respectively, valve seat and said damping fluid passing between said upper and lower cavities through said second throttle means so as to damper movement of said armature.

2. An electromagnetic valve according to claim 1, characterized in the guide means comprises an annular guide part for the armature and having an axial internal groove that at least in part defines the second throttle means.

3. An electromagnetic valve according to claim 1, characterized in the guide means comprises an axially extending annular guide part for the armature and having an axial internal groove that at least in part defines the second throttle means, and that the dividing means comprises an annular flange joined to the annular guide part to extend radially outwardly of the guide part.

4. An electromagnetic valve according to claim 1, characterized in that said sealing means is a resilient sealing element for separating the first throttle means from the valve seat chamber.

5. An electromagnetic valve according to claim 4, characterized in that there is provided a supporting ring fixed to the armature second end portion, and a restoring spring holding the resilient sealing element captive and being clamped between the dividing means and the supporting ring.

6. An electromagnetic valve according to claim 4, characterized in that there is provided a supporting ring fixed to the armature second end portion, that the resilient sealing element has a first end portion and an axial opposite second end portion, the sealing element first end portion having a circumferential, angled and reinforced first collar and the sealing element second end portion having a circumferential, angled and reinforced second collar, the second collar being arranged on the supporting ring and the first collar being adjacent to the dividing means.

7. An electromagnetic valve according to claim 6, characterized in that the supporting ring has a circumferential projection that in combination with the second collar forms a channel for fluid to flow between the first throttle means and the and the valve seat chamber.

8. An electromagnetic valve according to claim 6, characterized in that the sealing element in combination with the guide means divides said lower and upper cavities into an inner chamber radially between the guide means and the sealing element and an outer chamber, and that the dividing means comprises an annual flange that in combination with the first collar forms a channel for fluid to flow between the inner chamber and the outer chamber.

9. An electromagnetic valve according to claim 8, characterized in that said second throttle means provides a throttle path between the damping chamber and the inner chamber.

10. An electromagnetic valve according to claim 9, characterized in that there is provide a one-way valve on at least one of the collars that opens toward the inner chamber.

11. An electromagnetic valve according to claim 1, characterized in that there is provided an inlet opening to the valve seat chamber for conducting a first medium to the valve seat chamber, and an outlet opening to the valve seat downstream of the valve seat chamber and that a second medium that is different from the first medium is provided in the damping chamber.

12. An electromagnetic valve according to claim 11, characterized in that the housing has a filling opening that opens to the damping chamber.

13. An electromagnetic valve according to claim 11, characterized in that there is provided a sealing element for sealing the filling opening.

14. An electromagnetic valve according to claim 10, characterized in that the filling opening has a filling opening.

* * * * *